Patented June 2, 1931

1,808,108

UNITED STATES PATENT OFFICE

JOSEPH W. HAWKS, OF PIQUA, OHIO

COMPOSITION OF MATERIAL FOR USE IN PANARY FERMENTATION

No Drawing.    Application filed December 17, 1927.  Serial No. 240,934.

This invention relates to a composition and the process of preparing and using it conjointly with other materials for use in panary fermentation, e. g., the primary fermentation of materials subsequently baked into bread, rolls, crackers, etc.

In the past various disadvantages and difficulties have been encountered in connection with panary fermentation.

Some of these can be enumerated as, (a) the lack of a more satisfactory aid to gluten development than those in use, (b) the inability to secure maximum hydration and the resulting loss in quantity of finished product possible through such maximum hydration, (c) the lack of stable hydration and the premature staling of the finished product caused thereby, (d) the lack of an ideal protective colloid, (e) the impossibility of allowing maximum mixing in order to attain the finest and most uniform texture in the finished product, (f) the necessity of allowing long fermenting periods, (g) the lack of uniformity, or wide variations, in methods of manipulating the dough batch required by the variation in conditions existing at the particular time and place of mixing, and (h) the necessity of carefully selecting a grade of ingredients with particular reference to the fineness and uniformity of the texture desired in the finished product.

The object of this invention is to produce a composition which, when used in a prescribed manner in connection with other ingredients in panary fermentation will substantially overcome these objectionable features by (1st) assuming the primary role of an agent of hydration and an aid to gluten development, (2nd) acting as a protective colloid in the commingling of the various primary ingredients, (3rd) acting as a definite nutrient media in the dough batch which has a stimulating effect upon the yeast growth, (4th) allowing use of ingredients of less uniform quality than otherwise required, and (5th) by decreasing fermentation time thereby decreasing the degree of care ordinarily required where the length of fermentation time demands that all surrounding conditions and circumstances be carefully considered, and thus simplifying the operation.

In carrying out that portion of my invention relating to the composition of materials for use in panary fermentation I employ edible gelatin or a similar animal protein, polyvalent acid or its derivatives, and a suitable filler such as starch, dextrine, or the like.

These are used in composition form, prepared in the manner and proportions indicated below, for use in conjunction with the dough batch to accomplish the results hereinbefore indicated.

To prepare the composition it is necessary that the ingredients just specified be pulverized and mixed so as to present a uniform mixture. The proportions of the various ingredients of the composition may be varied to effect different results.

For example, the gelatin substance is usually included to the extent of two parts, the filler to the extent of three parts, but the acid substance may be varied to the extent of from one-half to one part, depending upon the acid used and the degree to which the hydrogen ion concentration of the dough batch is desired to be raised, or the type of product that is desired. That is, to secure a greater hydrogen ion concentration, the quantity of the acid content is increased according to the extent of such concentration in the dough batch desired by the particular individual preparing the mixture. Briefly, this results in controlling the ultimate characteristics of the finished product by controlling the hydrogen ion concentration in the dough batch.

It is to be understood, of course, that none of the ingredients of the composition are to be boiled, cooked, or otherwise changed from their original state prior to mixture with the dough batch, all of their original functions and efficacy being thereby unimpaired and preserved.

The method of so preparing the composition prior to the actual mixing with the dough batch in which it is used, aside from its effect thereon, is of great convenience in that the individual proportions of each ingredient of the composition do not then have to be calculated and measured, the operation of mixing with the dough batch being solely that of measuring the required amount of the complete composition. The possibility of mistakes in obtaining the proper proportions are thereby reduced to a minimum.

In order to secure the desired results in the use of this composition in panary fermentation it is necessary to proceed in a definite manner.

The prepared composition hereinbefore referred to is first agitated in a sufficient quantity of water to allow swelling, the quantity of such composition being one and one-half (1½) parts to each 100 parts of flour in the total dough batch to be fermented.

This proportion is not set, the foregoing proportion being merely that used in the making of ordinary soft-crusted pan bread, and may be varied according to the proportion of gelatin and acid content desired in the unfermented dough batch.

A sufficient quantity of yeast to produce the desired fermentation of the particular dough being used is next agitated with the mixture until it is emulsified.

This emulsification is now introduced along with the other usual proportions of ingredients, excepting water, used in the regular procedure for panary fermentation. Water is mixed with the mass to an extent of at least 10% in excess of the usual quantity ordinarily used. This proportion will be increased as the proportion of the primary composition is increased.

The mixing of the various ingredients of the dough batch should now be carried on in the usual manner excepting it will be noted that due to the increased addition of water a very soft, thin mixture is obtained. It would ordinarily be the desire of the manipulator at this point to increase the dry ingredients in the mix. This must be avoided as it will be noted on continued mixing of the ingredients it finally becomes a very tenacious mass and gradually becomes compactly formed around the agitator.

When the mixing has been completed the dough batch is placed in suitable receptacles for fermentation, or rising. It will be noted, however, that as the composition acts as a definite nutrient media the period of fermentation will be materially lessened, depending upon the quantity of materials used by the particular individual in the preparation of the dough batch as well as the other surrounding conditions ordinarily affecting panary fermentation.

Further, as soon as the dough mass shows visible evidence of yeast activity the ordinary steps of preparing it for the oven should be carried out.

It is deemed advisable at this point to make a few explanations in connection with the physico-chemical properties of the composition used herein in order that the process of using it may be more completely understood and its novelty demonstrated.

I have been able, by the addition of this composition to starch free gluten flour to obtain results showing marked improvement both in character of finished product and in the methods of manipulation over instances where gluten flour, or gluten flour with the addition of acids or their derivatives, or both, were used without the composition.

The presence of the gelatin, aided by the acid, in the composition when added to the dough mass with sufficient water, results in a gradual swelling, the subdivision (aided by the mixing operation) of the internal phase of the mass, and the forming of a protective colloid around such internal phase, thereby permitting a degree of hydration or wetting approaching the maximum. This degree of hydration, and its stability accomplished through the protective colloidal effect upon the internal phase, results in a corresponding increase in the mass produced as compared with results obtained from the same quantity of basic ingredients where this composition is not used and this more nearly complete hydration is lacking.

A product involving the use of this composition and process will, due to this increased hydration, have greater keeping qualities than those produced by other means, as well as have an appearance more nearly approaching the ideal characteristics desired in products of its class.

With the use of the composition in the process indicated, once the hydration capacity of all the ingredients has been found it is quite possible to increase the mixing period. In cases where temperature increase in the mass due to friction generated in the agitating device can be controlled, increase as high as 100% in the usual mixing period may be obtained. The more thoroughly the mass is mixed or agitated the more nearly the perfect colloidal state is reached, thereby allowing the use of inferior grades of flour and resulting in a product of finer and more uniform texture than could be accomplished with less mixing.

The composition, due to its gelatin and acid content, forms an ideal medium for yeast growth. Consequently it allows for maximum yeast growth and with the mass developed to its highest colloidal state it allows the elimination of long fermentation stages, and variable conditions during the longer fermentation on periods usually required. This simplifies the matter of manipulating the mass.

In explaining my invention I have referred to the use of a polyvalent acid, or its derivatives, and monobasic acid phosphate is the acid of this class which I have usually employed in carrying out my invention. This class of acid has been found highly satisfactory but monovalent acids may be used, and I therefore do not limit myself to the use of polyvalent acids. I have also specified certain proportions of the ingredients used in the examples cited. These proportions are not set but may be varied to conform with conditions existing in the individual case.

Having thus described my invention I claim:

1. A composition for use in panary fermentation comprising edible gelatin and an acidulating medium.

2. A composition for use in panary fermentation, comprising edible gelatin, an acidulating medium, and a filler.

3. A composition for use in panary fermentation comprising edible gelatin and monobasic acid phosphate.

4. A composition for use in panary fermentation, comprising edible gelatin, monobasic acid phosphate, and a filler.

5. A composition for use in panary fermentation comprising two parts edible gelatin and one-half to one part of acidulating medium.

6. A composition for use in panary fermentation, comprising two parts of edible gelatin, one-half to one part of acidulating medium, and three parts filler.

7. A composition for use in panary fermentation comprising two parts edible gelatin and one-half to one part of monobasic acid phosphate.

8. A composition for use in panary fermentation, comprising two parts of edible gelatin, one-half to one part of monobasic acid phosphate, and a filler.

9. A composition for use in panary fermentation, comprising edible gelatin, acidulated in proportion to the hydrogen ion concentration desired when combined with a predetermined quantity if ingredient containing gluten or like protein.

10. A composition for use in panary fermentation comprising edible gelatin, and a filler, acidulated in proportion to the hydrogen ion concentration desired when combined with a predetermined quantity of ingredient containing gluten or like protein.

11. A composition for use in panary fermentation, comprising edible gelatin, and monobasic acid phosphate in proportion to the hydrogen ion concentration desired when combined with a predetermined quantity of ingredient containing gluten or like protein.

12. A composition for use in panary fermentation comprises edible gelatin, and a filler, and monobasic acid phosphate in proportion to the hydrogen ion concentration desired when combined with a predetermined quantity of ingredient containing gluten or like protein.

13. A method of producing a composition for use in panary fermentation which comprises mixing, pulverizing, and reducing to a uniform mixture edible gelatin and an acidulating medium.

14. A method of producing a composition for use in panary fermentation which comprises mixing, pulverizing, and reducing to a uniform mixture edible gelatin, an acidulating medium and a filler.

15. A method of producing a composition for use in panary fermentation which comprises mixing, pulverizing, and reducing to a uniform mixture edible gelatin and monobasic acid phosphate.

16. A method of producing a composition for use in panary fermentation which comprises mixing, pulverizing, and reducing to a uniform mixture edible gelatin, monobasic acid phosphate, and a filler.

17. The process of making a composition for panary fermentation which comprises adding to the dough a quantity of edible gelatin, acidulated in proportion to the hydrogen ion concentration desired in the mass, when chemically combined with the other usual ingredients.

18. The process of making a composition for panary fermentation which comprises adding to the dough a combination of edible gelatin with monobasic acid phosphate, in proportion to the hydrogen ion concentration desired in the mass when chemically combined with the other usual ingredients.

19. The process of making a composition for panary fermentation which comprises adding edible gelatin, acidulated, to the dough and other usual ingredients in proportion to the degree of hydration desired in the mass.

20. The process of making a composition for panary fermentation which comprises adding edible gelatin, acidulated with monobasic acid phosphate, to the dough and other usual ingredients in proportion to the degree of hydration desired in the mass.

In testimony whereof I affix my signature this 16th day of December, 1927.

JOSEPH W. HAWKS.